(12) United States Patent
Atchley et al.

(10) Patent No.: US 11,398,795 B2
(45) Date of Patent: Jul. 26, 2022

(54) ROOF INTEGRATED PHOTOVOLTAIC SYSTEM

(71) Applicant: GAF Energy LLC, Parsippany, NJ (US)

(72) Inventors: Brian Edward Atchley, Petaluma, CA (US); Peter Clemente, Warren, NJ (US); Nazar Dzoba, Edison, NJ (US); Anthony Folk, Whitehouse Station, NJ (US); Amy Ochsenrieter, Morristown, NJ (US); Daniel East, Petaluma, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 17/123,831

(22) Filed: Dec. 16, 2020

(65) Prior Publication Data

US 2021/0194411 A1    Jun. 24, 2021

Related U.S. Application Data

(60) Provisional application No. 62/951,300, filed on Dec. 20, 2019.

(51) Int. Cl.
*H02S 20/23* (2014.01)
*E04D 3/38* (2006.01)

(52) U.S. Cl.
CPC .............. *H02S 20/23* (2014.12); *E04D 3/38* (2013.01)

(58) Field of Classification Search
CPC .......... H02S 20/23; H02S 20/24; H02S 20/25; E04D 3/38
See application file for complete search history.

(56) References Cited

U.S. PATENT DOCUMENTS

| 4,636,577 | A | 1/1987 | Peterpaul |
| 5,642,596 | A | 7/1997 | Waddington |
| 6,046,399 | A | * 4/2000 | Kapner ................... F24S 25/61 |
| | | | 136/244 |
| 6,336,304 | B1 | 1/2002 | Mimura et al. |
| 6,341,454 | B1 | 1/2002 | Koleoglou |
| 7,155,870 | B2 | 1/2007 | Almy |

(Continued)

FOREIGN PATENT DOCUMENTS

| CA | 2829440 A1 | 4/2014 |
| CH | 700095 A2 | 6/2010 |

(Continued)

*Primary Examiner* — Eli S Mekhlin
(74) *Attorney, Agent, or Firm* — Greenberg Traurig, LLP

(57) ABSTRACT

A roof integrated photovoltaic system includes a starter bar having a foot base and configured to be installed to a roof deck, a plurality of water shedding layers, and a photovoltaic module. One of the plurality of water shedding layers is configured to be installed over the foot base of the starter bar, and one of another of which is configured to overlap and be installed over the one of the plurality of water shedding layers. The system further includes a foot module configured to be attached to an upper portion of the photovoltaic module. A lower portion of the photovoltaic module is configured to align with the foot base of the starter bar, and the foot module is configured to be affixed on a last overlapping layer of the plurality of water shedding layers to the roof deck.

17 Claims, 11 Drawing Sheets

(56) References Cited

U.S. PATENT DOCUMENTS

| | | |
|---|---|---|
| 7,487,771 B1 | 2/2009 | Eiffert et al. |
| 7,587,864 B2 | 9/2009 | McCaskill et al. |
| 7,666,491 B2 | 2/2010 | Yang et al. |
| 7,678,990 B2 | 3/2010 | McCaskill et al. |
| 7,678,991 B2 | 3/2010 | McCaskill et al. |
| 7,819,114 B2 | 10/2010 | Augenbraun et al. |
| 7,824,191 B1 | 11/2010 | Browder |
| 7,832,176 B2 | 11/2010 | McCaskill et al. |
| 8,215,070 B2 | 7/2012 | Railkar et al. |
| 8,371,076 B2 | 2/2013 | Jones et al. |
| 8,468,754 B2 | 6/2013 | Railkar et al. |
| 8,505,249 B2 | 8/2013 | Geary |
| 8,512,866 B2 | 8/2013 | Taylor |
| 8,623,499 B2 | 1/2014 | Viasnoff |
| 8,713,858 B1* | 5/2014 | Xie ................ F24S 25/613 |
| | | 52/58 |
| 8,713,860 B2 | 5/2014 | Railkar et al. |
| 8,925,262 B2 | 1/2015 | Railkar et al. |
| 8,994,224 B2 | 3/2015 | Mehta et al. |
| 9,145,498 B2 | 9/2015 | Ultsch |
| 9,169,646 B2 | 10/2015 | Rodrigues et al. |
| 9,171,991 B2 | 10/2015 | Pearce |
| 9,273,885 B2 | 3/2016 | Rodrigues et al. |
| 9,605,432 B1 | 3/2017 | Robbins |
| 9,670,353 B2 | 6/2017 | Peng et al. |
| 9,711,672 B2 | 7/2017 | Wang |
| 9,831,818 B2 | 11/2017 | West |
| 9,912,284 B2 | 3/2018 | Svec |
| 9,920,515 B2 | 3/2018 | Xing et al. |
| 9,923,515 B2 | 3/2018 | Rodrigues et al. |
| 9,987,786 B2 | 6/2018 | Stoiljkovic et al. |
| 9,991,412 B2 | 6/2018 | Gonzalez et al. |
| 10,015,933 B2 | 7/2018 | Boldrin |
| 10,027,273 B2 | 7/2018 | West et al. |
| 10,115,850 B2 | 10/2018 | Rodrigues et al. |
| 10,179,852 B2 | 1/2019 | Gossi et al. |
| 10,187,005 B2 | 1/2019 | Rodrigues et al. |
| 10,256,765 B2 | 4/2019 | Rodrigues et al. |
| 10,480,192 B2 | 11/2019 | Xing et al. |
| 10,669,414 B2 | 6/2020 | Li et al. |
| 10,907,355 B2 | 2/2021 | Hubbard et al. |
| 10,914,063 B2 | 2/2021 | Lee et al. |
| RE48,555 E | 5/2021 | Cancio et al. |
| 11,015,085 B2 | 5/2021 | Bruns et al. |
| 11,065,849 B2 | 7/2021 | Ackermann et al. |
| 2002/0053360 A1 | 5/2002 | Kinoshita et al. |
| 2002/0102422 A1 | 8/2002 | Hubbard et al. |
| 2003/0101662 A1* | 6/2003 | Ullman ................ H02S 20/23 |
| | | 52/27 |
| 2003/0217768 A1 | 11/2003 | Guha |
| 2005/0115603 A1 | 6/2005 | Yoshida et al. |
| 2005/0144870 A1 | 7/2005 | Dinwoodie |
| 2006/0042683 A1 | 3/2006 | Gangemi |
| 2007/0181174 A1 | 8/2007 | Ressler |
| 2008/0006323 A1 | 1/2008 | Kalkanoglu et al. |
| 2008/0035140 A1 | 2/2008 | Placer et al. |
| 2008/0315061 A1 | 12/2008 | Fath |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0159118 A1 | 6/2009 | Kalkanoglu |
| 2009/0229652 A1 | 9/2009 | Mapel et al. |
| 2010/0101634 A1 | 4/2010 | Frank et al. |
| 2010/0313499 A1 | 12/2010 | Gangemi |
| 2010/0326488 A1 | 12/2010 | Aue et al. |
| 2011/0030761 A1 | 2/2011 | Kalkanoglu et al. |
| 2011/0036386 A1 | 2/2011 | Browder |
| 2011/0048507 A1 | 3/2011 | Livsey et al. |
| 2011/0058337 A1 | 3/2011 | Han |
| 2011/0132427 A1 | 6/2011 | Kalkanoglu et al. |
| 2011/0239555 A1 | 10/2011 | Cook et al. |
| 2011/0302859 A1 | 12/2011 | Crasnianski |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2013/0014455 A1 | 1/2013 | Grieco |
| 2015/0024159 A1 | 1/2015 | Bess et al. |
| 2016/0359451 A1* | 12/2016 | Mao ................ H01L 31/02013 |
| 2017/0159292 A1 | 6/2017 | Chihlas et al. |
| 2017/0203555 A1 | 7/2017 | Wang et al. |
| 2018/0094438 A1 | 4/2018 | Wu et al. |
| 2018/0094439 A1 | 4/2018 | Wang et al. |
| 2018/0281347 A1 | 10/2018 | Gossi |
| 2018/0351502 A1 | 12/2018 | Almy et al. |
| 2020/0020819 A1 | 1/2020 | Farhangi |
| 2020/0224419 A1 | 7/2020 | Boss et al. |
| 2021/0002898 A1 | 1/2021 | Knebel et al. |
| 2021/0095474 A1 | 4/2021 | Yang et al. |
| 2021/0113970 A1 | 4/2021 | Stainer et al. |
| 2021/0171808 A1 | 6/2021 | Ackermann et al. |
| 2021/0172174 A1 | 6/2021 | Ackermann et al. |

FOREIGN PATENT DOCUMENTS

| | | |
|---|---|---|
| EP | 2784241 A1 | 10/2014 |
| WO | 2011/049944 A1 | 4/2011 |

* cited by examiner

ROOF INTEGRATED PHOTOVOLTAIC SYSTEM

CROSS-REFERENCE TO RELATED APPLICATION

This application is a Section 111(a) application relating to and claiming the benefit of commonly-owned, U.S. Provisional Patent Application Ser. No. 62/951,300, filed Dec. 20, 2019, entitled "ROOF INTEGRATED PHOTOVOLTAIC SYSTEM," the contents of which is incorporated herein by reference in its entirety.

FIELD OF THE INVENTION

The present invention relates to roofing systems for structures and, more particularly, roofing systems having integrated photovoltaic systems.

BACKGROUND OF THE INVENTION

Photovoltaic systems having solar panel modules are commonly installed on roofing of structures. What is needed is a roof integrated photovoltaic system that provides for improved installation and serviceability while maintaining a top water shedding layer.

SUMMARY OF THE INVENTION

In an embodiment, a method, comprising installing at least one starter bar to a roof deck, wherein the at least one starter bar includes a foot base; installing one of a first plurality of water shedding layers over the foot base of the at least one starter bar; overlapping at least one of another of the first plurality of water shedding layers over the one of the first plurality of water shedding layers; and installing at least one first photovoltaic module, each of the at least one first photovoltaic module having a top surface, a bottom surface, an upper portion, a lower portion, a pair of side portions, each of which extends from the upper portion to the lower portion, and at least one first foot module attached to the upper portion, wherein the lower portion of each of the least one first photovoltaic module is aligned with the foot base of the at least one starter bar, and the at least one first foot module is affixed on a last overlapping layer of the at least one of another of the first plurality of water shedding layers to the roof deck.

In an embodiment, the last overlapping layer of the at least one of another of the first plurality of water shedding layers includes a second water shedding layer. In an embodiment, the at least one of another of the first plurality of water shedding layers includes a second water shedding layer overlapping the one of the first plurality of water shedding layers, and a third water shedding layer overlapping the second water shedding layer, the third water shedding layer being the last overlapping layer of the at least one of another of the first plurality of water shedding layers. In an embodiment, the at least one of another of the first plurality of water shedding layers includes a second water shedding layer overlapping the one of the first plurality of water shedding layers, a third water shedding layer overlapping the second water shedding layer, and a fourth water shedding layer overlapping the third water shedding layer, the fourth water shedding layer being the last overlapping layer of the at least one of another of the first plurality of water shedding layers. In an embodiment, the method further comprises the step of affixing the one of the first plurality of water shedding layers and the second water shedding layer to the roof deck. In an embodiment, the one of a first plurality of water shedding layers and the second water shedding layer are affixed to the roof deck by a plurality of nails. In an embodiment, the one of a first plurality of water shedding layers and the second water shedding layer are affixed to the roof deck by an adhesive.

In an embodiment, the method further comprises the step of affixing the one of the first plurality of water shedding layers and the second and third water shedding layers to the roof deck. In an embodiment, the one of the first plurality of water shedding layers and the second and third water shedding layers are affixed to the roof deck by a plurality of nails. In an embodiment, the method further comprises the step of affixing the one of the first plurality of water shedding layers and the second, third and fourth water shedding layers to the roof deck. In an embodiment, the one of the first plurality of water shedding layers and the second, third and fourth water shedding layers are affixed to the roof deck by a plurality of nails. In an embodiment, the one of the first plurality of water shedding layers and the second, third and fourth water shedding layers are affixed to the roof deck by an adhesive.

In an embodiment, the second water shedding layer includes a first edge that is positioned offset from the foot base of the starter bar. In an embodiment, the second water shedding layer includes a first edge that is positioned offset from the foot base of the starter bar, and the third water shedding layer includes a first edge that is positioned offset from the first edge of the second water shedding layer. In an embodiment, the second water shedding layer includes a first edge that is positioned offset from the foot base of the starter bar, the third water shedding layer includes a first edge that is positioned offset from the first edge of the second water shedding layer, and the fourth water shedding layer includes a first edge that is positioned offset from the first edge of the third water shedding layer. In an embodiment, the at least one first foot module includes a plurality of first foot modules. In an embodiment, the at least one starter bar includes a plurality of starter bars.

In an embodiment, the at least one first photovoltaic module includes a plurality of first photovoltaic modules, and wherein each of the lower portions of each of the plurality of first photovoltaic modules is aligned with a corresponding one of the foot base of the plurality of starter bars. In an embodiment, the plurality of first photovoltaic modules is installed in a formation of a first row. In an embodiment, the method further comprises the steps of installing one of a second plurality of water shedding layers over the at least one first module foot, and overlapping at least one of another of the second plurality of water shedding layers over the one of the second plurality of water shedding layers. In an embodiment, the method further comprises the step of installing at least one second photovoltaic module, the at least one second photovoltaic module having a top surface, a bottom surface, an upper portion, a lower portion, a pair of side portions, each of which extends from the upper portion of the at least one second photovoltaic module to the lower portion of the at least one second photovoltaic module, and at least one second foot module attached to the upper portion of the at least one second photovoltaic module, wherein the lower portion of the at least one second photovoltaic module is aligned with the at least one first foot module of the at least one first photovoltaic module, and the at least one second foot module is affixed on a last overlapping layer of the at least one of another of the second plurality of water shedding layers to the roof deck.

In an embodiment, the last overlapping layer of the at least one of another of the second plurality of water shedding layers includes a fifth water shedding layer. In an embodiment, the at least one of another of the second plurality of water shedding layers includes a fifth water shedding layer overlapping the one of the second plurality of water shedding layers, and a sixth water shedding layer overlapping the fifth water shedding layer, the sixth water shedding layer being the last overlapping layer of the at least one of another of the second plurality of water shedding layers. In an embodiment, the at least one of another of the second plurality of water shedding layers includes a fifth water shedding layer overlapping the one of the second plurality of water shedding layers, a sixth water shedding layer overlapping the fifth water shedding layer, and a seventh water shedding layer overlapping the sixth water shedding layer, the seventh water shedding layer being the last overlapping layer of the at least one of another of the second plurality of water shedding layers. In an embodiment, the method further comprises the step of affixing the one of the second plurality of water shedding layers and the fifth water shedding layer to the roof deck. In an embodiment, the one of the second plurality of water shedding layers and the fifth water shedding layer are affixed to the roof deck by a plurality of nails. In an embodiment, the one of the second plurality of water shedding layers and the fifth water shedding layer are affixed to the roof deck by an adhesive. In an embodiment, the method further comprises the step of affixing the one of the second plurality of water shedding layers and the fifth and sixth water shedding layers to the roof deck. In an embodiment, the one of the second plurality of water shedding layers and fifth and sixth water shedding layers are affixed to the roof deck by a plurality of nails. In an embodiment, the one of the second plurality of water shedding layers and fifth and sixth water shedding layers are affixed to the roof deck by an adhesive.

In an embodiment, the method further comprises the step of affixing the one of the second plurality of water shedding layers and the fifth, sixth and seventh water shedding layers to the roof deck. In an embodiment, the one of the second plurality of water shedding layers and the fifth, sixth and seventh water shedding layers are affixed to the roof deck by a plurality of nails. In an embodiment, the one of the second plurality of water shedding layers and the fifth, sixth and seventh water shedding layers are affixed to the roof deck by an adhesive. In an embodiment, the fifth water shedding layer includes a first edge that is positioned offset from the at least one first module foot of the at least one first photovoltaic module. In an embodiment, the fifth water shedding layer includes a first edge that is positioned offset from the at least one first module foot of the at least one first photovoltaic module, and the sixth water shedding layer includes a first edge that is positioned offset from the first edge of the fifth water shedding layer. In an embodiment, the fifth water shedding layer includes a first edge that is positioned offset from at least one first module foot of the at least one first photovoltaic module, the sixth water shedding layer includes a first edge that is positioned offset from the first edge of the fifth water shedding layer, and the seventh water shedding layer includes a first edge that is positioned offset from the first edge of the sixth water shedding layer.

In an embodiment, the at least one second foot module includes a plurality of second foot modules. In an embodiment, the at least one first photovoltaic module includes a plurality of first photovoltaic modules, and the at least one second photovoltaic module includes a plurality of second photovoltaic modules, wherein each of the lower portions of each of the plurality of second photovoltaic modules is aligned with a corresponding one of the at least one first module feet of each of the plurality of first photovoltaic modules. In an embodiment, the plurality of second photovoltaic modules is installed in a formation of a second row. In an embodiment, each of the plurality of second photovoltaic modules is aligned with a corresponding one of the plurality of first photovoltaic modules. In an embodiment, the method further comprises the step of installing at least one row of a plurality of shingles on the roof deck prior to the step of installing the at least one starter bar, wherein the at least one starter bar is affixed to at least one of the plurality of shingles. In an embodiment, each of the first and second pluralities of water shedding layers is flexible. In an embodiment, each of the first and second pluralities of water shedding layers is non-flexible.

In an embodiment, the step of overlapping the at least one of another of the first plurality of water shedding layers includes overlapping the at least one of another of the first plurality of water shedding layers over a first portion of the one of the first plurality of water shedding layers to create a second, revealed portion, and wherein the second, revealed portion of the one of the first plurality of water shedding layers includes a width that is approximately equal to a length of the at least one photovoltaic module. In an embodiment, the length of the at least one photovoltaic module extends from the upper portion of the at least one photovoltaic module to the lower portion of the at least one photovoltaic module. In an embodiment, the one of the first plurality of water shedding layers includes a width, and wherein the width of the second, revealed portion of the one of the first plurality of water shedding layers is approximately equal to half of the width of the one of the first plurality of water shedding layers.

In an embodiment, a method, comprising installing at least one starter bar to a roof deck, wherein the at least one starter bar includes a foot base; installing one of a plurality of water shedding layers over the foot base of the at least one starter bar; overlapping at least one of another of the plurality of water shedding layers over the one of the plurality of water shedding layers; affixing at least one first module foot on the at least one of another of the plurality of water shedding layers to the roof deck; and installing at least one first photovoltaic module, each of the at least one first photovoltaic module having a top surface, a bottom surface, an upper portion, a lower portion, a pair of side portions, each of which extends from the upper portion to the lower portion, wherein the lower portion of each of the least one first photovoltaic module is aligned with the foot base of the at least one starter bar, and the upper portion of the at least one first photovoltaic module is aligned with and attached to the at least one first module foot.

In an embodiment, a system, comprising a foot base having a first member and a second member extending angularly from the first member, wherein the foot base is configured to be installed on a roof deck such that the first member is positioned on the roof deck and the second member extends outwardly from the roof deck; and a flashing member having a first portion, and a second portion overlapping the first member of the foot base, wherein the first portion of the flashing member is configured to be affixed to the roof deck. In an embodiment, the first portion of the flashing member is affixed to the roof deck by a plurality of nails. In an embodiment, the first member of the foot base is affixed to the roof deck. In an embodiment, the first member of the foot base is affixed to the roof deck by at least one nail. In an embodiment, the first and second members of the foot base are integral. In an embodiment, the second member is substantially perpendicular to the first member. In an embodiment, the flashing member includes a third portion extending angularly from the second portion and attached to the second member of the foot base. In an embodiment, the third portion of the flashing member is attached to the second member of the foot base by at least one rivet. In an embodiment, the third portion of the flashing member is attached to the second member of the foot base by at least one screw. In an embodiment, the third portion of the flashing member is attached to the second member of the foot base by a spot weld. In an embodiment, the third portion of the flashing member is attached to the second member of the foot base by an adhesive.

In an embodiment, a system, comprising at least one starter bar configured to be installed to a roof deck, wherein the at least one starter bar includes a foot base; a first plurality of water shedding layers, one of which is configured to be installed over the foot base of the at least one starter bar, and at least one of another of which is configured to overlap and be installed over the one of the first plurality of water shedding layers; at least one first photovoltaic module having a top surface, a bottom surface, an upper portion, a lower portion, and a pair of side portions, each of which extends from the upper portion to the lower portion; and at least one first foot module configured to be attached to the upper portion of the at least one first photovoltaic module, wherein the lower portion of each of the least one first photovoltaic module is configured to align with the foot base of the at least one starter bar, and the at least one first foot module is configured to be affixed on a last overlapping layer of the at least one of another of the first plurality of water shedding layers to the roof deck.

In an embodiment, the last overlapping layer of the at least one of another of the first plurality of water shedding layers includes a second water shedding layer. In an embodiment, the at least one of another of the first plurality of water shedding layers includes a second water shedding layer configured to overlap the one of the first plurality of water shedding layers, and a third water shedding layer configured to overlap the second water shedding layer, the third water shedding layer being the last overlapping layer of the at least one of another of the first plurality of water shedding layers. In an embodiment, the at least one of another of the first plurality of water shedding layers includes a second water shedding layer configured to overlap the one of the first plurality of water shedding layers, a third water shedding layer configured to overlap the second water shedding layer, and a fourth water shedding layer configured to overlap the third water shedding layer, the fourth water shedding layer being the last overlapping layer of the at least one of another of the first plurality of water shedding layers. In an embodiment, the one of the first plurality of water shedding layers and the second water shedding layer are configured to be affixed to the roof deck. In an embodiment, the one of a first plurality of water shedding layers and the second water shedding layer are configured to be affixed to the roof deck by a plurality of nails. In an embodiment, the one of a first plurality of water shedding layers and the second water shedding layer are configured to be affixed to the roof deck by an adhesive. In an embodiment, the one of the first plurality of water shedding layers and the second and third water shedding layers are configured to be affixed to the roof deck. In an embodiment, the one of the first plurality of water shedding layers and the second and third water shedding layers are configured to be affixed to the roof deck by a plurality of nails. In an embodiment, the one of the first plurality of water shedding layers and the second and third water shedding layers are configured to be affixed to the roof deck by an adhesive. In an embodiment, the one of the first plurality of water shedding layers and the second, third and fourth water shedding layers are configured to be affixed to the roof deck. In an embodiment, the one of the first plurality of water shedding layers and the second, third and fourth water shedding layers are configured to be affixed to the roof deck by a plurality of nails. In an embodiment, the one of the first plurality of water shedding layers and the second, third and fourth water shedding layers are configured to be affixed to the roof deck by an adhesive.

In an embodiment, the at least one first foot module includes a plurality of first foot modules. In an embodiment, the at least one starter bar includes a plurality of starter bars. In an embodiment, the at least one first photovoltaic module includes a plurality of first photovoltaic modules, and wherein each of the lower portions of each of the plurality of first photovoltaic modules is configured to align with a corresponding one of the foot base of the plurality of starter bars.

In an embodiment, the system further comprises a second plurality of water shedding layers, one of which is configured to be installed over the at least one first module foot, and at least one of another of which is configured to overlap and be installed over the one of the second plurality of water shedding layers. In an embodiment, the system further comprises at least one second photovoltaic module, the at least one second photovoltaic module having a top surface, a bottom surface, an upper portion, a lower portion, and a pair of side portions, each of which extends from the upper portion of the at least one second photovoltaic module to the lower portion of the at least one second photovoltaic module; and at least one second foot module configured to be attached to the upper portion of the at least one second photovoltaic module, wherein the lower portion of the at least one second photovoltaic module is configured to align with the at least one first foot module of the at least one first photovoltaic module, and the at least one second foot module is configured to be affixed on a last overlapping layer of the at least one of another of the second plurality of water shedding layers to the roof deck.

In an embodiment, the last overlapping layer of the at least one of another of the second plurality of water shedding layers includes a fifth water shedding layer. In an embodiment, the at least one of another of the second plurality of water shedding layers includes a fifth water shedding layer configured to overlap the one of the second plurality of water shedding layers, and a sixth water shedding layer configured to overlap the fifth water shedding layer, the sixth water shedding layer being configured to be the last overlapping layer of the at least one of another of the second plurality of water shedding layers. In an embodiment, the at least one of another of the second plurality of water shedding layers includes a fifth water shedding layer configured to overlap the one of the second plurality of water shedding layers, a sixth water shedding layer configured to overlap the fifth water shedding layer, and a seventh water shedding layer configured to overlap the sixth water shedding layer, the seventh water shedding layer being configured to be the last overlapping layer of the at least one of another of the second plurality of water shedding layers. In an embodiment, the one of the second plurality of water shedding layers and the fifth water shedding layer are configured to be affixed to the roof deck. In an embodiment, the one of the second plurality of water shedding layers and the fifth water shedding layer are configured to be affixed to the roof deck by a plurality of nails. In an embodiment, the one of the second plurality of water shedding layers and the fifth water shedding layer are configured to be affixed to the roof deck by an adhesive. In an embodiment, the one of the second plurality of water shedding layers and the fifth and sixth water shedding layers are configured to be affixed to the roof deck. In an embodiment, the one of the second plurality of water shedding layers and fifth and sixth water shedding layers are configured to be affixed to the roof deck by a plurality of nails. In an embodiment, the one of the second plurality of water shedding layers and fifth and sixth water shedding layers are configured to be affixed to the roof deck by an adhesive. In an embodiment, the one of the second plurality of water shedding layers and the fifth, sixth and seventh water shedding layers are configured to be affixed to the roof deck. In an embodiment, the one of the second plurality of water shedding layers and the fifth, sixth and seventh water shedding layers are configured to be affixed to the roof deck by a plurality of nails. In an embodiment, the one of the second plurality of water shedding layers and the fifth, sixth and seventh water shedding layers are configured to be affixed to the roof deck by an adhesive.

In an embodiment, the at least one second foot module includes a plurality of second foot modules. In an embodiment, the at least one first photovoltaic module includes a plurality of first photovoltaic modules, and the at least one second photovoltaic module includes a plurality of second photovoltaic modules, wherein each of the lower portions of each of the plurality of second photovoltaic modules is configured to align with a corresponding one of the at least one first module feet of each of the plurality of first photovoltaic modules.

In an embodiment, the system further comprises a plurality of shingles configured to be installed on the roof deck. In an embodiment, the at least one starter bar is configured to be affixed to at least one of the plurality of shingles. In an embodiment, the system further comprises flashing configured to be installed on the roof deck and positioned intermediate the plurality of shingles and at least one of the first and second plurality of water shedding layers. In an embodiment, the flashing includes step flashing having a plurality of flashing members configured to be positioned substantially perpendicular to the roof deck, and wherein a side edge of each the first and second plurality of water shedding layers is juxtaposed with one side of each of the plurality of flashing members. In an embodiment, the side edge of each of the first and second plurality of water shedding layers is attached to the one side of each of the plurality of flashing members by an adhesive. In an embodiment, the flashing includes double-edge flashing having a first planar member and a second planar member extending substantially perpendicular to the first planar member, wherein the plurality of shingles is configured to be installed over the first planar member on one side of the second planar member, and the first and second plurality of water shedding layers are configured to be installed over the first planar member on an opposite side of the second planar member.

In an embodiment, the system further comprises a bracket for an MLPE, wherein the bracket is configured to be attached to the at least one first photovoltaic module and position the MLPE under the bottom surface of the at least one first photovoltaic module. In an embodiment, the bracket includes a pocket that is sized and shaped to removably receive the MLPE. In an embodiment, the pocket includes a C-shape. In an embodiment, the bracket includes at least one hook member configured to be removably attached to at least one of the top portion, the lower portion and either of the side portions of the at least one first photovoltaic module.

In an embodiment, each of the first and second pluralities of water shedding layers is flexible. In an embodiment, each of the first and second pluralities of water shedding layers is non-flexible.

DETAILED DESCRIPTION

Figure 1A:
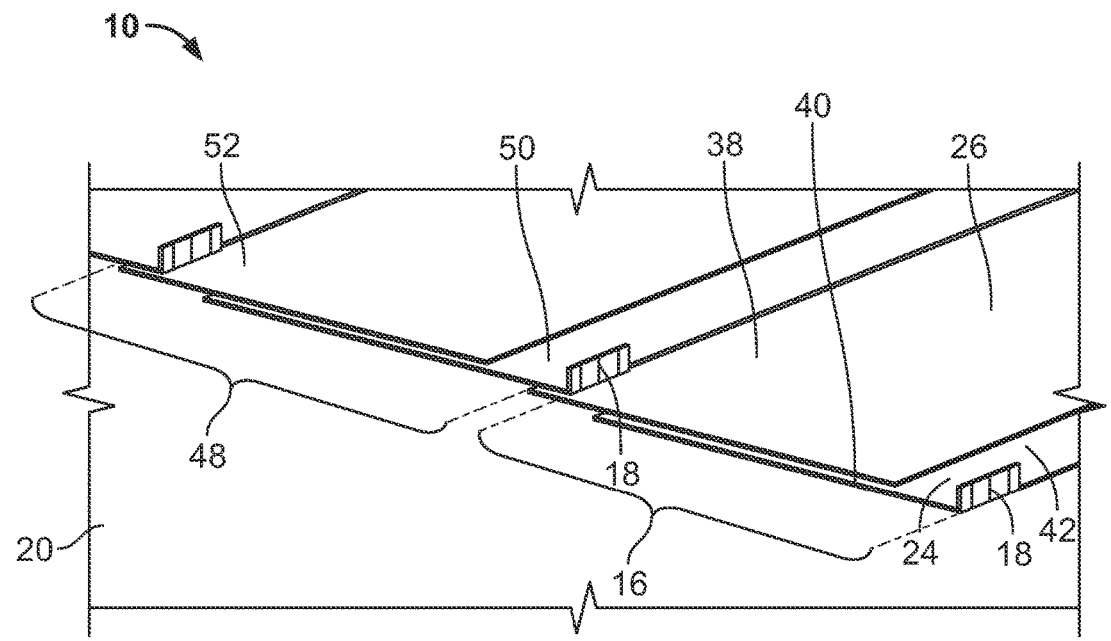
FIGS. 1A through 1D are top perspective views of embodiments of roofing water shedding layers employed by a roof integrated photovoltaic system, showing various widths of water shedding layers.
Figure 1B:
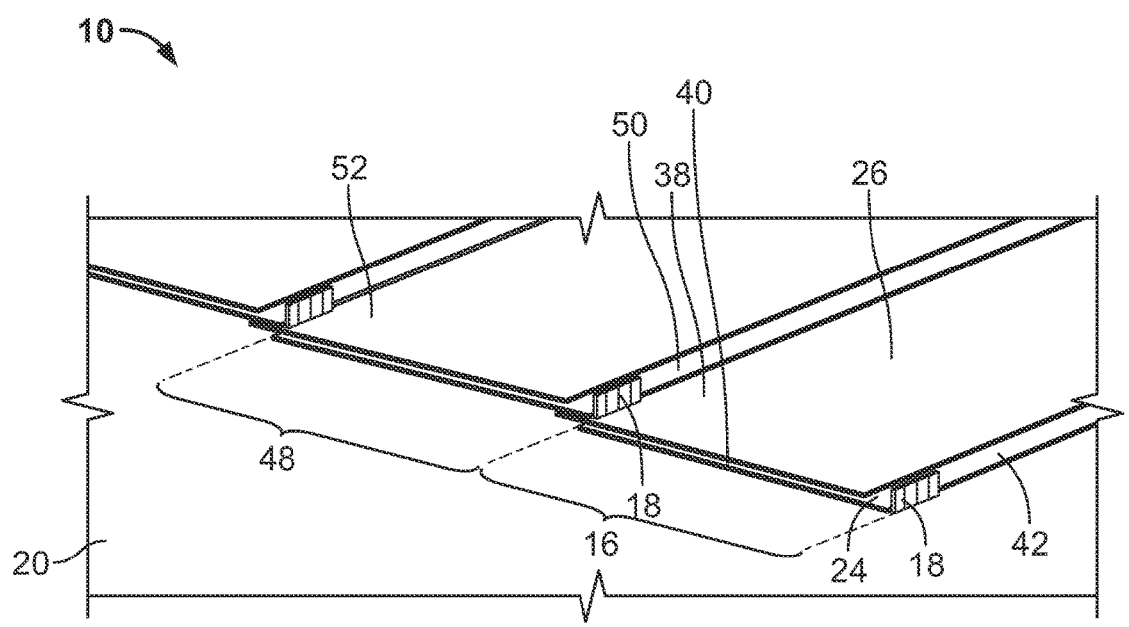
Figure 2:
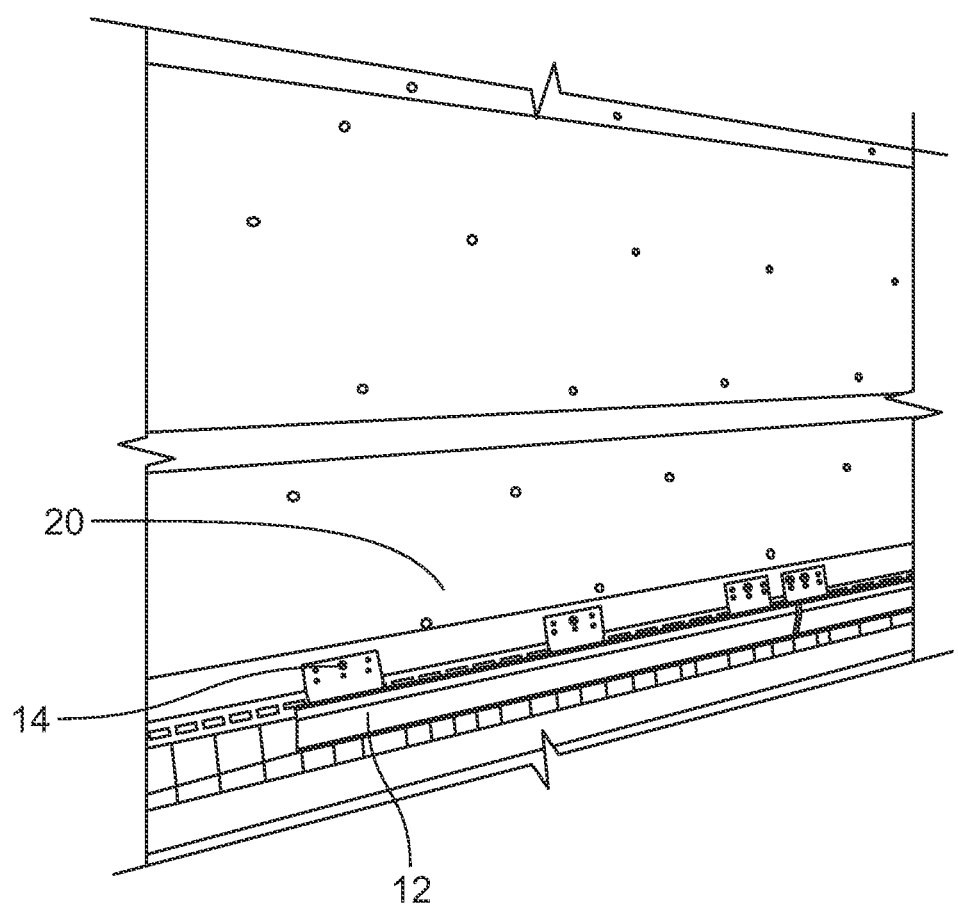
FIG. 2 is a photograph of an embodiment of a starter bar for a roof integrated photovoltaic system.

Referring to FIGS. 1A, 1B and 2, in an embodiment, a roof integrated photovoltaic system 10 includes at least one starter bar 12 having at least one foot base 14, a first plurality of water shedding layers 16, and at least one first foot module 18. In an embodiment, the at least one starter bar 12 is configured to be installed to a roof deck 20. In an embodiment, the at least one starter bar 12 is a metal extrusion, such as an aluminum extrusion. In an embodiment, the at least one foot base 14 is an L-shaped bracket. In an embodiment, the at least one foot base 14 includes a plurality of foot bases 14. In an embodiment, the at least one starter bar 12 includes a plurality of starter bars 12. In an embodiment, a plurality of shingles 22 is configured to be installed on the roof deck 20. In an embodiment, the at least one starter bar 12 is configured to be affixed to at least one of the plurality of shingles 22 (see FIG. 5). In an embodiment, each of the first plurality of water shedding layers 16 consists of MINERAL GUARD® roof rolling material manufactured and sold by GAF.

In an embodiment, one layer 24 of the first plurality of water shedding layers 16 is configured to be installed over the at least one foot base 14 of the at least one starter bar 12, and at least one of another layer 26 of the plurality of water shedding layers 16 is configured to overlap and be installed over the one layer 24 of the first plurality of water shedding layers 16. In an embodiment, each of the first plurality of water shedding layers 16 includes water shedding properties and acts a moisture barrier for the roof deck 20. In an embodiment, each of the first plurality of water shedding layers 16 includes fire retardant properties.

Figure 3:
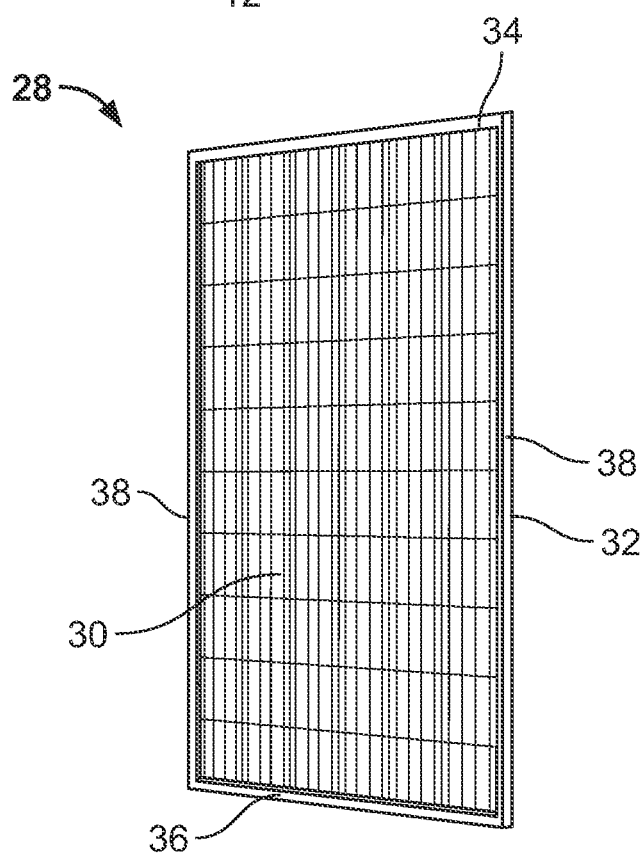
FIG. 3 is an embodiment of a photovoltaic module.

Referring to FIG. 3, in an embodiment, the system 10 includes at least one photovoltaic module 28 includes a top surface 30, a bottom surface 32, an upper portion 34, a lower portion 36, and a pair of side portions 38, each of which extends from the upper portion 34 to the lower portion 36. In an embodiment, the photovoltaic module 28 includes a locking frame as described and shown in U.S. Pat. No. 10,256,765 entitled "Roof Integrated Photovoltaic System," issued on Apr. 9, 2019, which is incorporated by reference herein. In an embodiment, the at least one first foot module 18 is configured to be attached to the upper portion 34 of the photovoltaic module 28, wherein the lower portion 36 of each of the least one first photovoltaic module is configured to align with the at least one foot base 14 of the at least one starter bar 12, and the at least one first foot module 18 is configured to be affixed on a last overlapping layer of the at least one layer 24 of another of the first plurality of water shedding layers 16 to the roof deck 20. In an embodiment, the last overlapping layer of the at least one of another layer 26 of the first plurality of water shedding layers 16 is a second water shedding layer 26. In an embodiment, the one layer 24 of the first plurality of water shedding layers 16 and the second water shedding layer 26 are configured to be affixed to the roof deck 20. In an embodiment, the one layer 24 of a first plurality of water shedding layers 16 and the second water shedding layer 26 are configured to be affixed to the roof deck 20 by a plurality of nails. In an embodiment, the one layer 24 of a first plurality of water shedding layers 16 and the second water shedding layer 26 are configured to be affixed to the roof deck 20 by an adhesive.

In an embodiment, the at least one of another layer 26 of the first plurality of water shedding layers 16 overlaps the at least one layer 24 of the first plurality of water shedding layers 16 over a first portion 40 of the one layer 24 of the first plurality of water shedding layers 16 to create a second, revealed portion 42. In an embodiment, the second, revealed portion 42 of the one layer 24 of the first plurality of water shedding layers 16 includes a width that is approximately equal to a length of the at least one photovoltaic module 28. In an embodiment, the length of the at least one photovoltaic module 28 extends from the upper portion 34 of the at least one photovoltaic module 28 to the lower portion 36 of the at least one photovoltaic module 28. In an embodiment, the one layer 24 of the first plurality of water shedding layers 16 includes a width, and wherein the width of the second, revealed portion 42 of the one layer 24 of the first plurality of water shedding layers 16 is approximately equal to half of the width of the one layer 24 of the first plurality of water shedding layers 16.

In another embodiment, the at least one of another layer 26 of the first plurality of water shedding layers 16 includes a second water shedding layer 26 configured to overlap the one layer 24 of the first plurality of water shedding layers 16, and a third water shedding layer 44 configured to overlap the second water shedding layer 26, the third water shedding layer 44 being the last overlapping layer of the at least one of another layer 26 of the first plurality of water shedding layers 16. In an embodiment, the one layer 24 of the first plurality of water shedding layers 16 and the second and third water shedding layers 26, 44 are configured to be affixed to the roof deck 20. In an embodiment, the one layer 24 of the first plurality of water shedding layers 16 and the second and third water shedding layers 26, 44 are configured to be affixed to the roof deck 20 by a plurality of nails. In an embodiment, the one layer 24 of the first plurality of water shedding layers 16 and the second and third water shedding layers 26, 44 are configured to be affixed to the roof deck 20 by an adhesive.

Figure 1C:
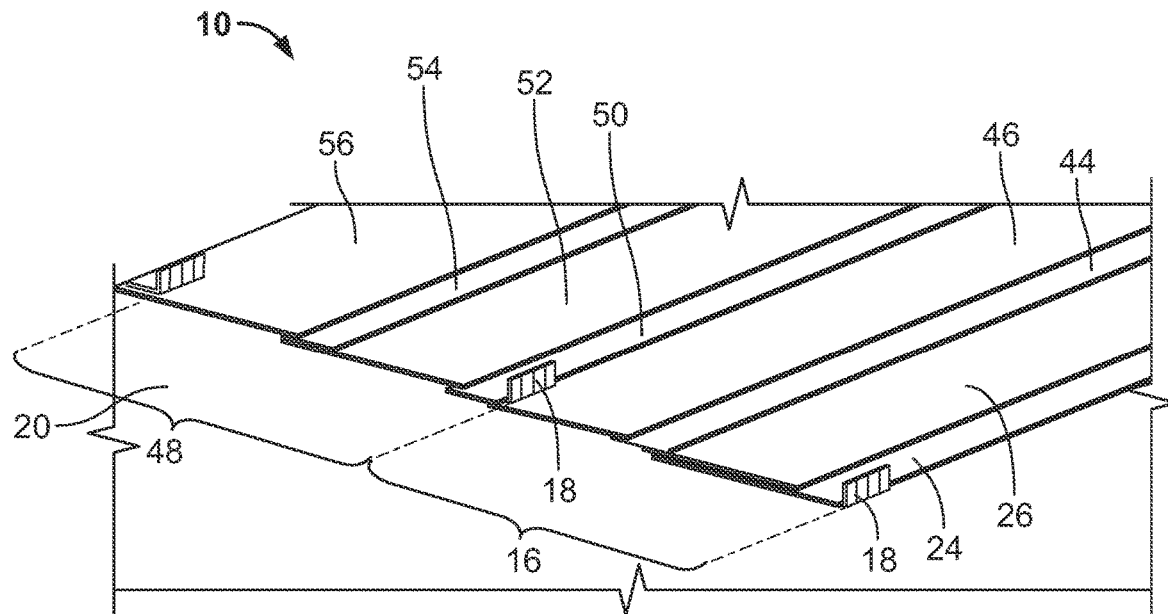
Figure 1D:
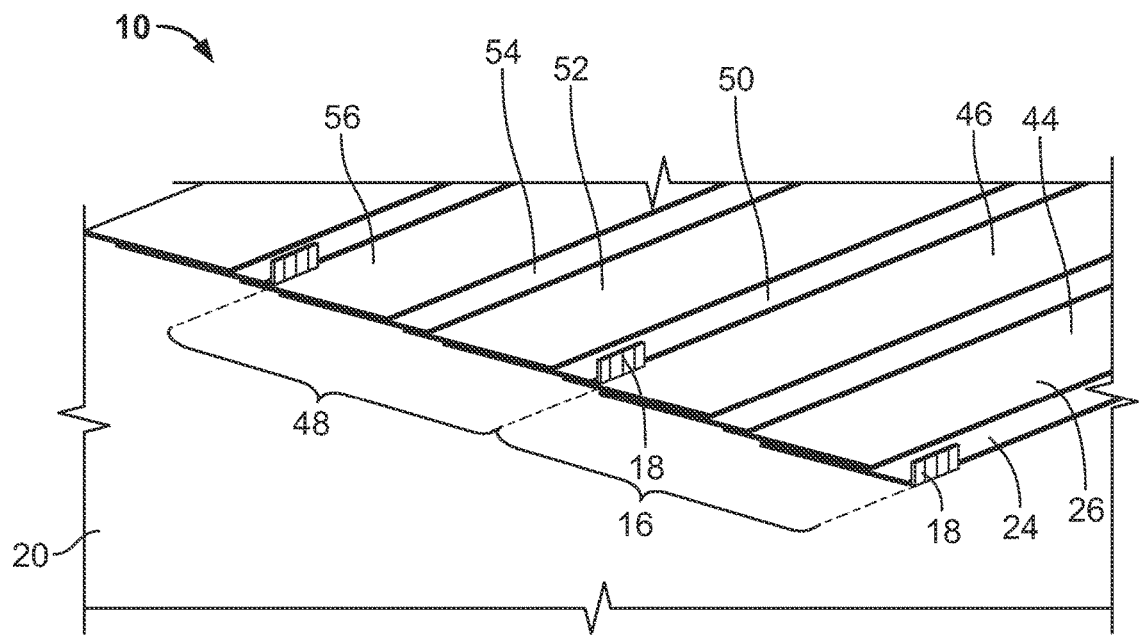

Referring to FIGS. 1C and 1D, in another embodiment, the at least one of another layer 26 of the first plurality of water shedding layers 16 includes a second water shedding layer 26 configured to overlap the one layer 24 of the first plurality of water shedding layers 16, a third water shedding layer 44 configured to overlap the second water shedding layer 26, and a fourth water shedding layer 46 configured to overlap the third water shedding layer 44, the fourth water shedding layer 46 being the last overlapping layer of the at least one of another layer 26 of the first plurality of water shedding layers 16. In an embodiment, the one layer 24 of the first plurality of water shedding layers 16 and the second, third and fourth water shedding layers 26, 44, 46 are configured to be affixed to the roof deck 20. In an embodiment, the one layer 24 of the first plurality of water shedding layers 16 and the second, third and fourth water shedding layers 26, 44, 46 are configured to be affixed to the roof deck 20 by a plurality of nails. In an embodiment, the one layer 24 of the first plurality of water shedding layers 16 and the second, third and fourth water shedding layers 26, 44, 46 are configured to be affixed to the roof deck 20 by an adhesive.

In an embodiment, the at least one first foot module 18 includes a plurality of first foot modules 18. In an embodiment, the at least one starter bar 12 includes a plurality of starter bars 12. In an embodiment, the at least one first photovoltaic module 28 includes a plurality of first photovoltaic modules 28, and each of the lower portions 36 of each of the plurality of first photovoltaic modules 28 is configured to align with a corresponding one of the at least one foot base 14 of the plurality of starter bars 12.

Referring back to FIGS. 1A and 1B, in an embodiment, the system 10 includes a second plurality of water shedding layers 48, one layer 50 of which is configured to be installed over the at least one first foot module 18, and at least one of another layer 52 of which is configured to overlap and be installed over the one layer 50 of the second plurality of water shedding layers 48. In an embodiment, the system 10 includes at least one second photovoltaic module 28, the lower portion 36 of the at least one second photovoltaic module 28 is configured to align with the at least one first foot module 18 of the at least one first photovoltaic module 28, and at least one second foot module 18 is configured to be affixed on a last overlapping layer of the at least one of another of the second plurality of water shedding layers 48 to the roof deck 20. In an embodiment, each of the second plurality of water shedding layers 48 consists of MINERAL GUARD® roof rolling material manufactured and sold by GAF.

In an embodiment, the last overlapping layer of the at least one of another layer 52 of the second plurality of water shedding layers 48 is a fifth water shedding layer 52. In an embodiment, the one layer 50 of the second plurality of water shedding layers 48 and the fifth water shedding layer 52 are configured to be affixed to the roof deck 20. In an embodiment, the one layer 50 of the second plurality of water shedding layers 48 and the fifth water shedding layer 52 are configured to be affixed to the roof deck 20 by a plurality of nails. In an embodiment, the one 50 of the second plurality of water shedding layers 48 and the fifth water shedding layer 52 are configured to be affixed to the roof deck 20 by an adhesive.

In an embodiment, the at least one of another layer 52 of the second plurality of water shedding layers 48 includes a fifth water shedding layer 52 configured to overlap the one 50 of the second plurality of water shedding layers 48, and a sixth water shedding layer 54 configured to overlap the fifth water shedding layer 52, the sixth water shedding layer 54 being configured to be the last overlapping layer of the at least one of another layer 52 of the second plurality of water shedding layers 48. In an embodiment, the one 50 of the second plurality of water shedding layers 48 and the fifth and sixth water shedding layers 52, 54 are configured to be affixed to the roof deck 20. In an embodiment, the one 50 of the second plurality of water shedding layers 48 and fifth and sixth water shedding layers 52, 54 are configured to be affixed to the roof deck 20 by a plurality of nails. In an embodiment, the one 50 of the second plurality of water shedding layers 48 and fifth and sixth water shedding layers 52, 54 are configured to be affixed to the roof deck 20 by an adhesive.

Referring back to FIGS. 1C and 1D, in an embodiment, the at least one of another 50 of the second plurality of water shedding layers 48 includes a fifth water shedding layer 52 configured to overlap the one 50 of the second plurality of water shedding layers 48, a sixth water shedding layer 54 configured to overlap the fifth water shedding layer 52, and a seventh water shedding layer 56 configured to overlap the sixth water shedding layer 54, the seventh water shedding layer 56 being configured to be the last overlapping layer of the at least one of another layer 52 of the second plurality of water shedding layers 48.

In an embodiment, the second plurality of water shedding layers 48 and the fifth, sixth and seventh water shedding layers 52, 54, 56 are configured to be affixed to the roof deck 20. In an embodiment, the one 50 of the second plurality of water shedding layers 48 and the fifth, sixth and seventh water shedding layers 52, 54, 56 are configured to be affixed to the roof deck 20 by a plurality of nails. In an embodiment, the one 50 of the second plurality of water shedding layers 48 and the fifth, sixth and seventh water shedding layers 52, 54, 56 are configured to be affixed to the roof deck 20 by an adhesive.

Figure 4:
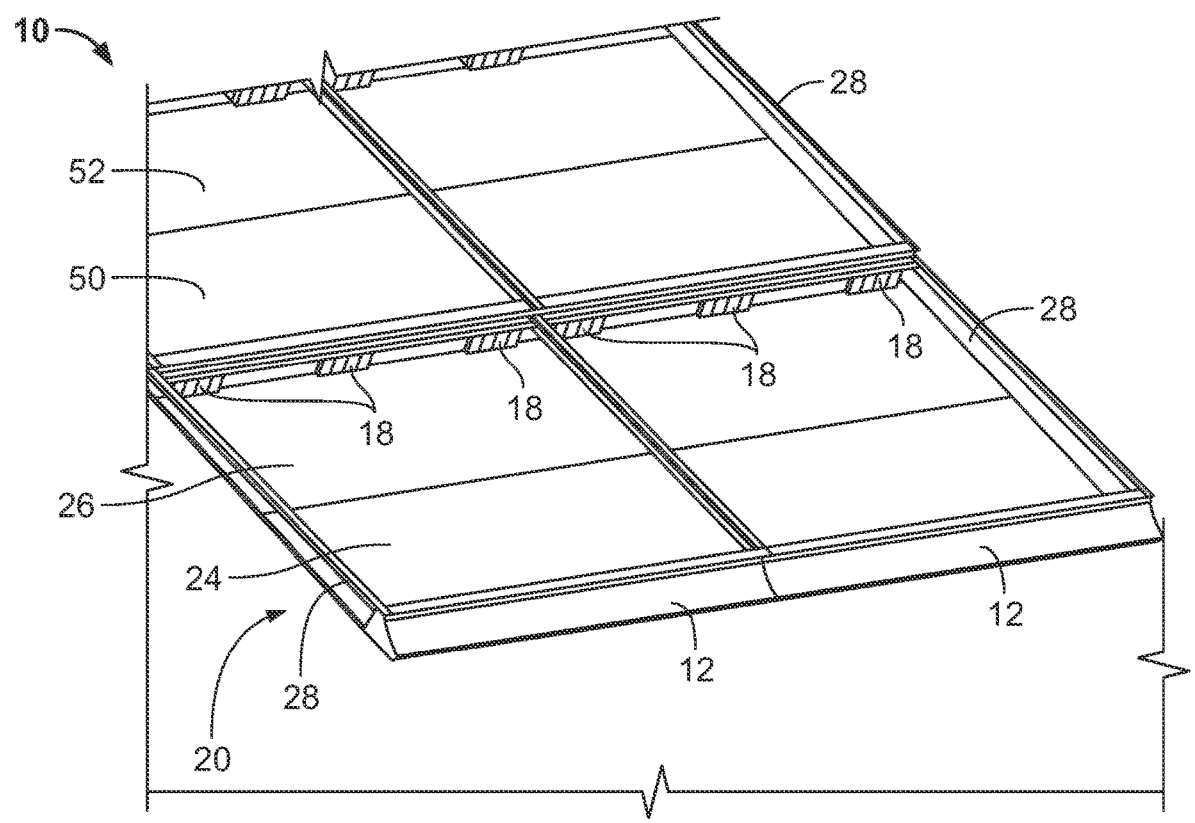
FIG. 4 is a top perspective view of an embodiment of a roof integrated photovoltaic system.
Figure 5:
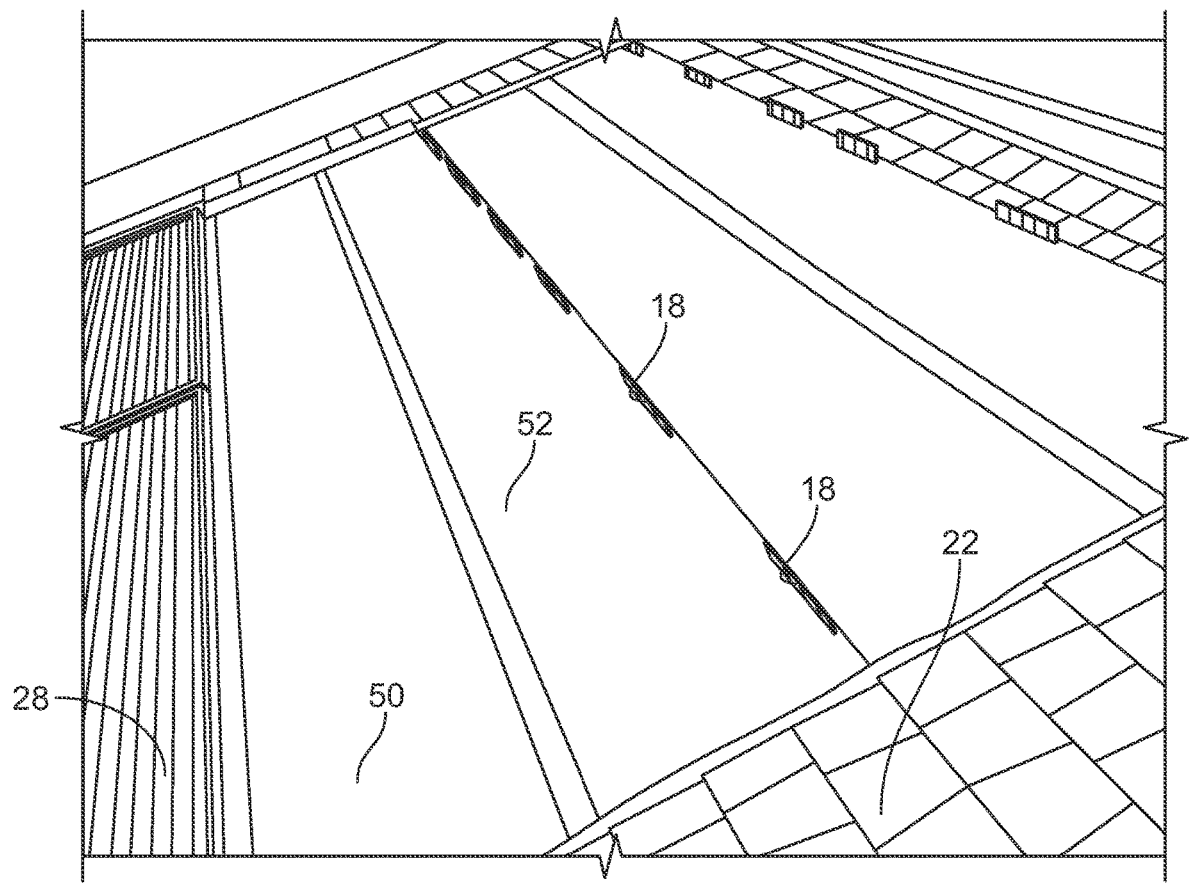
FIG. 5 is a photograph of an embodiment of an installed roof integrated photovoltaic system including one row of installed photovoltaic modules.

In an embodiment, the at least one second foot module 18 includes a plurality of second foot modules 18. In an embodiment, the at least one first photovoltaic module 28 includes a plurality of first photovoltaic modules 28, and the at least one second photovoltaic module 28 includes a plurality of second photovoltaic modules 28, wherein each of the lower portions 36 of each of the plurality of second photovoltaic modules 28 is configured to align with a corresponding one of the at least one first foot module 18 of each of the plurality of first photovoltaic modules 28. FIGS. 4 and 5 show the system installed.

Figure 6:
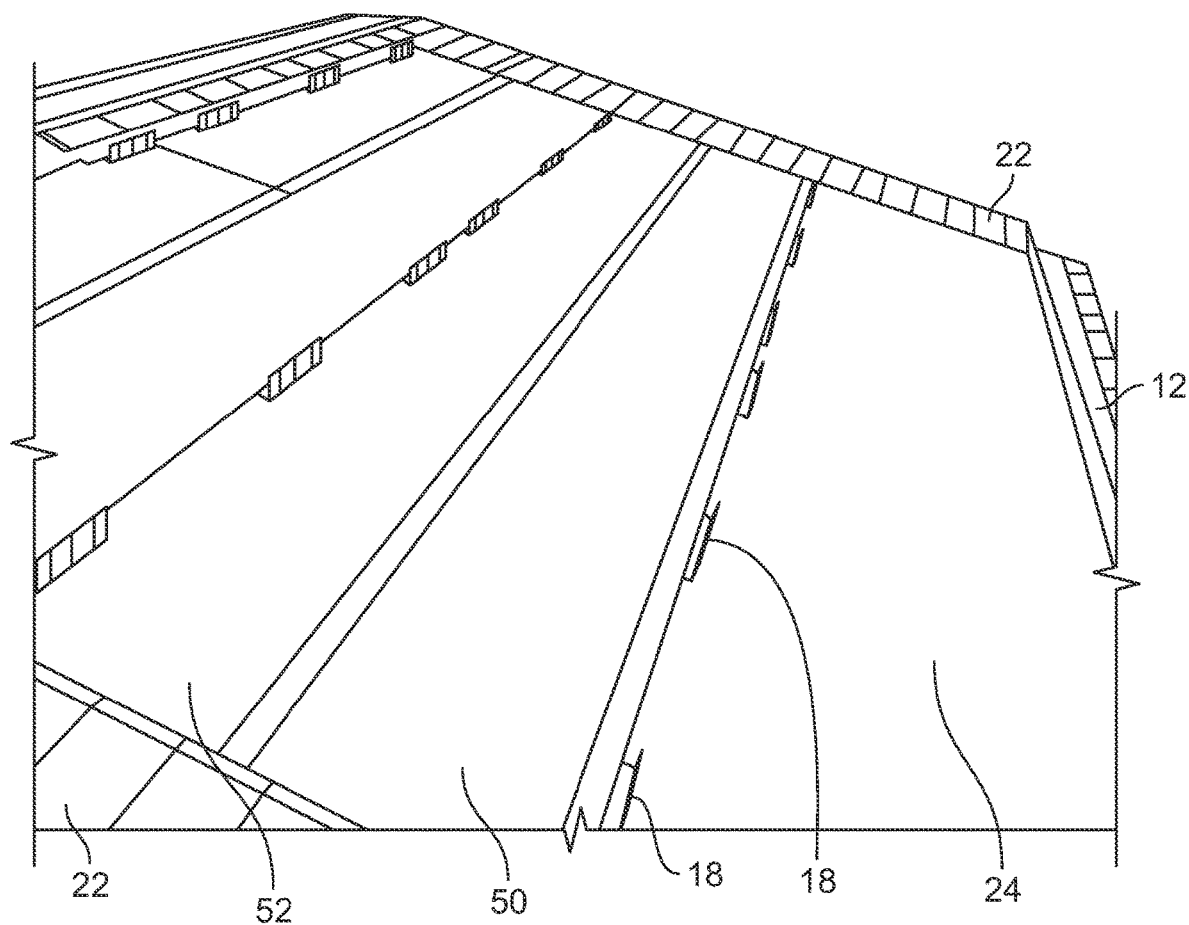
FIG. 6 is a photograph of an embodiment of an installed roof integrated photovoltaic system with the photovoltaic modules removed.

Referring to FIG. 6, in an embodiment, when one or more of the photovoltaic modules 28 require servicing, repair or replacement, the photovoltaic modules 28 are removed from the at least one first foot module 18 and/or the at least one starter bar 12, as applicable, leaving the at least one first foot module 18 and the at least one starter bar 12 attached to the roof deck 20.

Referring to FIGS. 7A through 7D, in an embodiment, a roofing foot base system 100 includes a foot base 102 having a first member 104 and a second member 106 extending angularly from the first member 104. In an embodiment, the foot base 102 is configured to be installed on the roof deck 20 such that the first member 104 is positioned on the roof deck 20 and the second member 106 extends outwardly from the roof deck 20. In an embodiment, the roofing foot base system 100 includes a flashing member 108 having a first portion 110, and a second portion 112 overlapping the first member 104 of the foot base 102. In an embodiment, the first portion 110 of the flashing member 108 is configured to be affixed to the roof deck 20. In an embodiment, the first portion 110 of the flashing member 108 is affixed to the roof deck 20 by a plurality of nails 114. In an embodiment, the first member 104 of the foot base 102 is affixed to the roof deck 20. In an embodiment, the first member 104 of the foot base 102 is affixed to the roof deck 20 by at least one nail. In an embodiment, the first and second members 104, 106 of the foot base 102 are integral. In an embodiment, the second member 106 is substantially perpendicular to the first member 104.

Figure 7A:
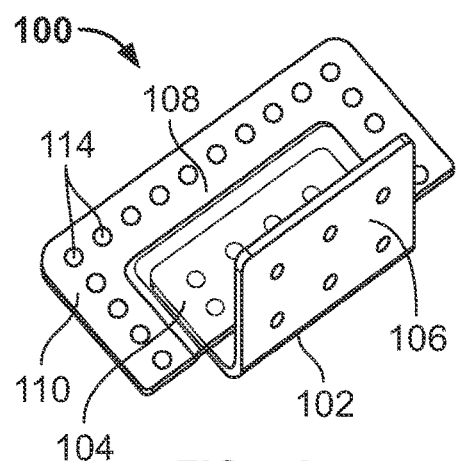
FIGS. 7A through 7D are top perspective, top plan, and two side elevational views, respectively, of embodiments of a system including a foot base and a flashing member for a roof.
Figure 7B:
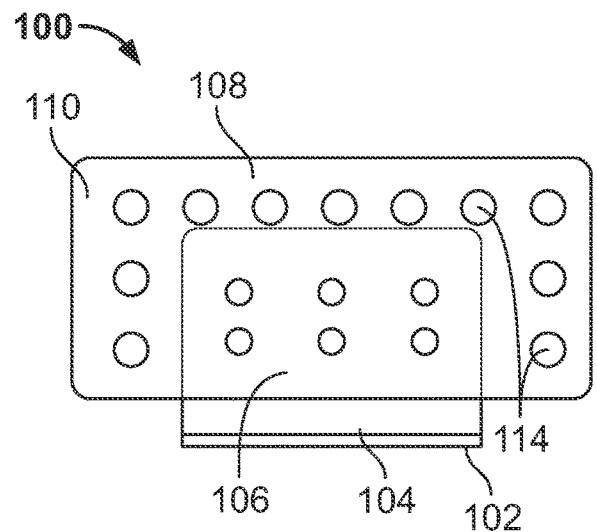
Figure 7C:
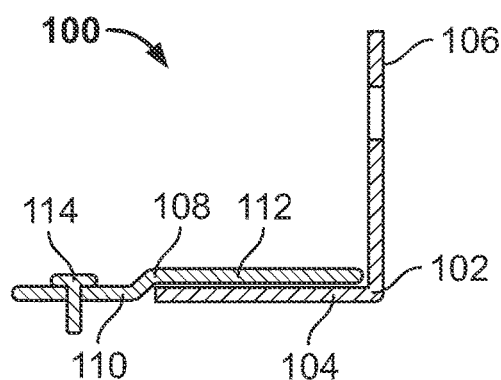
Figure 7D:
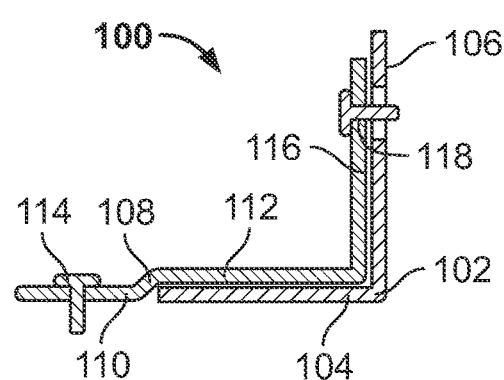

Referring to FIG. 7D, in another embodiment, the flashing member 108 includes a third portion 116 extending angularly from the second portion 112 and attached to the second member 106 of the foot base 102. In an embodiment, the third portion 116 of the flashing member 108 is attached to the second member 106 of the foot base 102 by at least one rivet 118. In an embodiment, the third portion 116 of the flashing member 108 is attached to the second member 106 of the foot base 102 by at least one screw. In an embodiment, the third portion 116 of the flashing member 108 is attached to the second member 106 of the foot base 102 by a spot weld. In an embodiment, the third portion 116 of the flashing member 108 is attached to the second member 106 of the foot base 102 by an adhesive.

In an embodiment, the flashing member 108 is made from metal. In an embodiment, the flashing member 108 is made from aluminum. In another embodiment, the flashing member 108 is made from stainless steel. In another embodiment, the flashing member 108 is made from galvalume. In another embodiment, the flashing member 108 is made from a polymer. In an embodiment, the flashing member 108 is made from a composite material. In another embodiment, the flashing member 108 is made from fiberglass.

Figure 8:
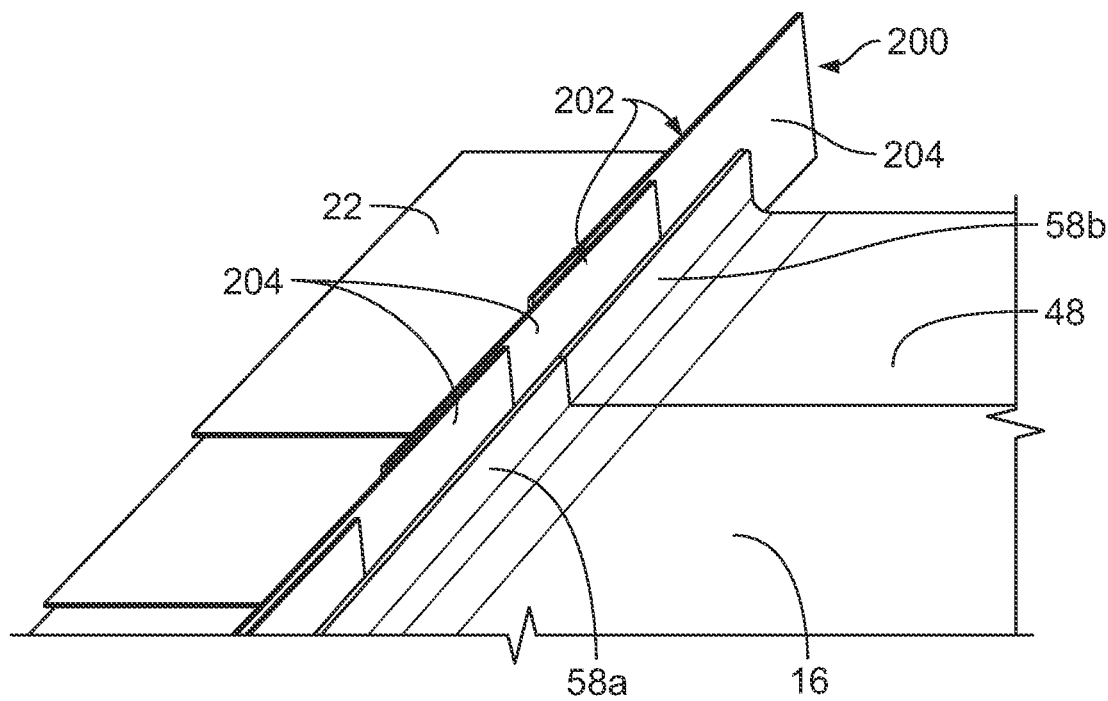
FIG. 8 is a top perspective view of a transition between roof water shedding layers and roofing shingles with step flashing.
Figure 9:
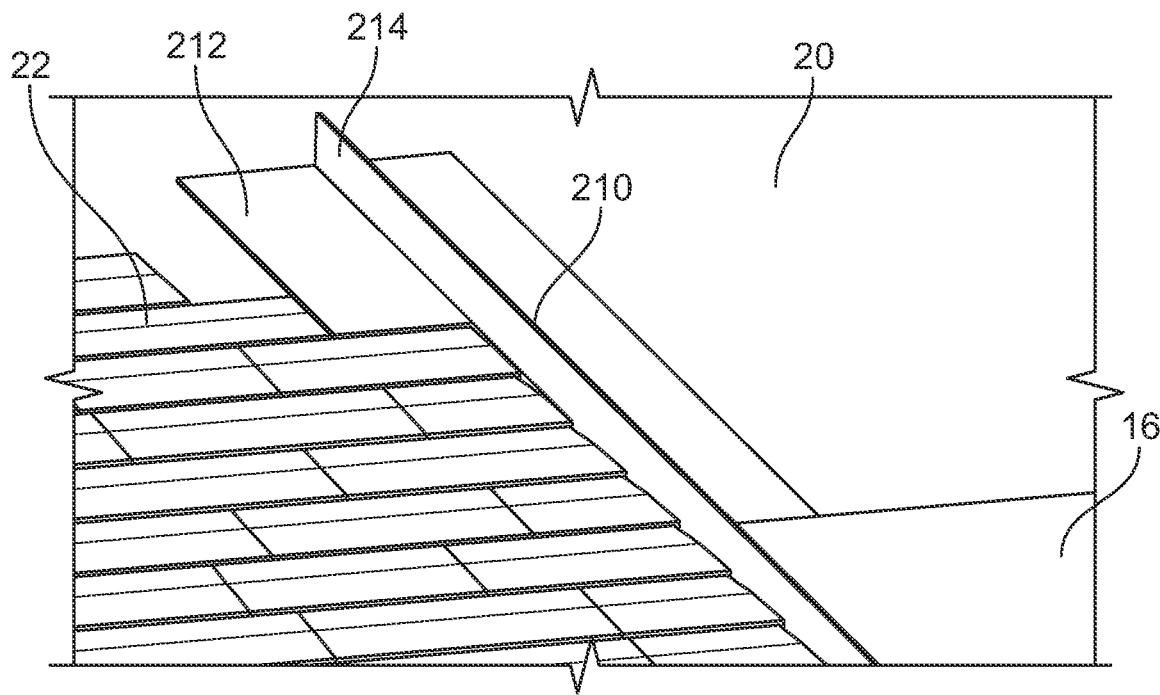
FIG. 9 is a top perspective view of a transition between roof water shedding layers and roofing shingles with T-type/double-edge flashing.

Referring to FIGS. 8 and 9, in an embodiment, the system 10 further comprises flashing configured to be installed on the roof deck 20 and positioned intermediate the plurality of shingles 22 and at least one of the first and second plurality of water shedding layers 16, 48. Referring to FIG. 8, in an embodiment, the flashing includes step flashing 200 having a plurality of flashing members 202 configured to be positioned substantially perpendicular to the roof deck 20, and wherein side edges 58a, 58b of each the first and second plurality of water shedding layers 16, 48, respectively, are juxtaposed with one side 204 of each of the plurality of flashing members 202. In an embodiment, the side edges 58a, 58b of each of the first and second plurality of water shedding layers 16, 48 is attached to the one side 204 of each of the plurality of flashing members 202 by an adhesive.

Referring to FIG. 9, in an embodiment, the flashing includes double-edge flashing 210 having a first planar member 212 and a second planar member 214 extending substantially perpendicular to the first planar member 212. In an embodiment, the plurality of shingles 22 is configured to be installed over the first planar member 212 on one side of the second planar member 214, and the first and second plurality of water shedding layers 16, 48 are configured to be installed over the first planar member 212 on an opposite side of the second planar member 214.

In an embodiment, the system 10 creates a solar plane that is different than the shingle plane comprised of the roofing system surrounding the photovoltaic modules 28. The transition between shingle plane and the solar plane is compatible with the system 10 and the application of flashing between the planes assures water shedding at the surface covered with the shingles 22. In an alternate embodiment, sealant materials are used for sealing the boundary area between the solar plane and the shingle plane.

Figure 10:
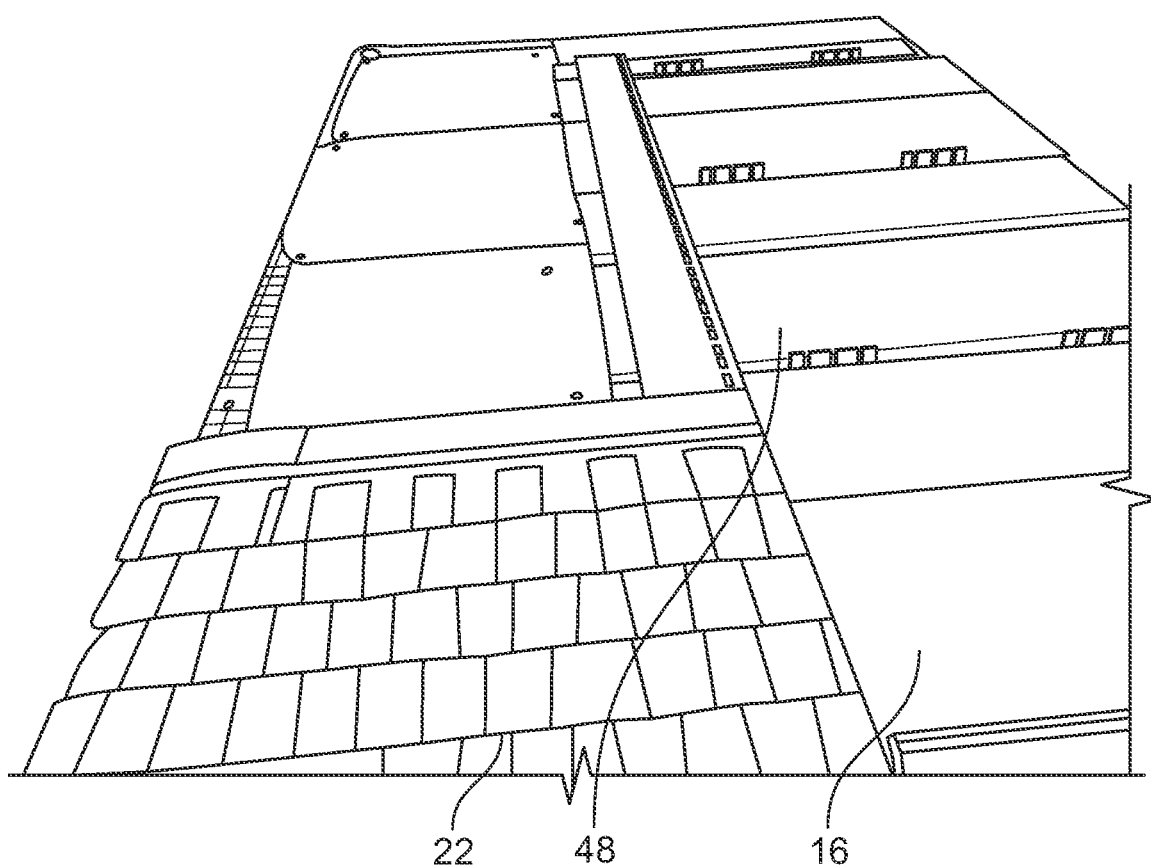
FIG. 10 is a photograph of an embodiment of a roof integrated photovoltaic system showing a transition between a solar roofing plane and a roof shingle plane without flashing.

Referring to FIG. 10, in an embodiment, to avoid any flashing between the solar plane and the shingle plane, the water shedding layers 16, 48 are extended within a certain width under the roofing plane. In an embodiment, the overlapping area is mechanically bounded by a vertical layer that includes adhesive on both sides. In an embodiment, the water shedding layers 16, 48 are extended under the shingle area, which the shingles 22 will be installed. The water shedding layers 16, 48 are installed vertically on top of another water shedding layer. In an embodiment, the shingles 22 are installed to cover the top water shedding layer of the overlapping region. In an embodiment, top corners of the shingles 22 are clipped to keep water flow towards the array and avoid water running across the top of the shingles 22.

Figure 11A:
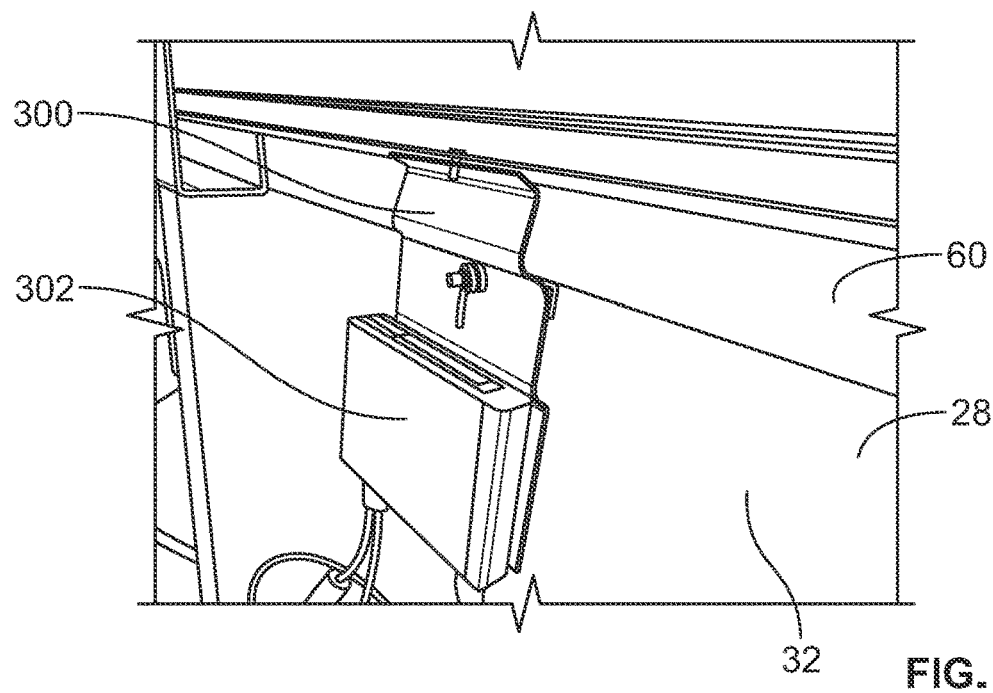
FIGS. 11A through 11C show embodiments of brackets for module-level power electronics for a photovoltaic system.
Figure 11B:
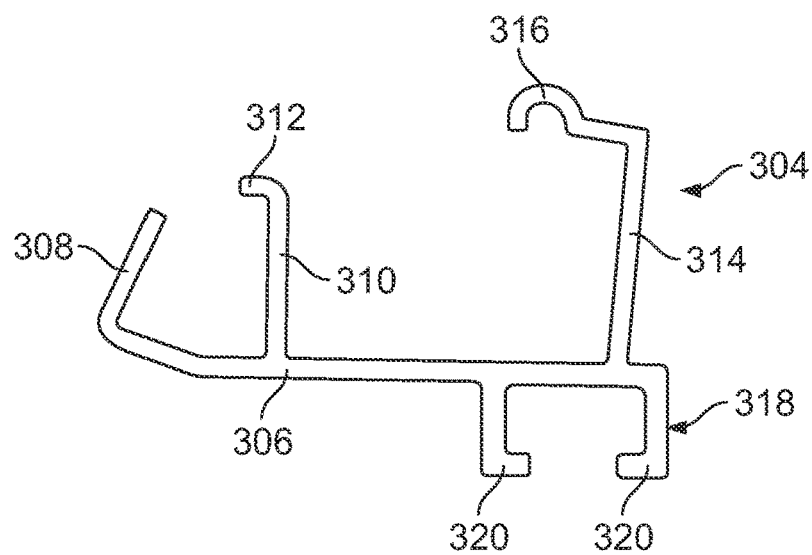

Referring to FIG. 11A, in an embodiment, the system 10 includes a bracket 300 for a module level power electronic (MLPE) apparatus 302. In an embodiment, the bracket 300 is configured to be attached to the any of the photovoltaic modules 28 and position the MLPE apparatus 302 under the bottom surface 32 thereof such that the photovoltaic modules 28 cover the MLPE apparatus 302 to which it is attached. In some embodiments, the MLPE apparatus 302 includes optimizers, such as DC/DC converters, microinverters, such as DC/AC converters, rapid shutdown devices, and power monitoring devices. Referring to FIG. 11B, in an embodiment, a bracket 304 includes a linear base member 306, a first, L-shaped member 308 extending from one side thereof and at one end of the base member 306, a second, J-shaped member 310 extending from the one side of the base member 306 proximate to the first member 308 and having a hook portion 312, and a third member 314 extending from one side of the base member 306 at an opposite end thereof. In an embodiment, the third member 314 includes a hook portion 316. In an embodiment, the first, second and third members 308, 310, 314 are each connected to a frame 60 of one of the upper portion 34, lower portion 36 or side portions 38 of the photovoltaic modules 28. In an embodiment, the hook portions 312, 316 of the second and third members 310, 314, respectively, are configured to be secured to the frame 60. In an embodiment, the bracket 304 includes a pocket extending from an opposite side of the base member 306 and include a pair of opposed L-shaped members 320. In an embodiment, the pocket 318 is sized and shaped to removably receive the MLPE apparatus 302. In an embodiment, the pocket 318 includes a C-shape cross-section. In other embodiment, the pocket 318 includes other suitable shapes and sizes to secure the MLPE apparatus 302.

Figure 11C:
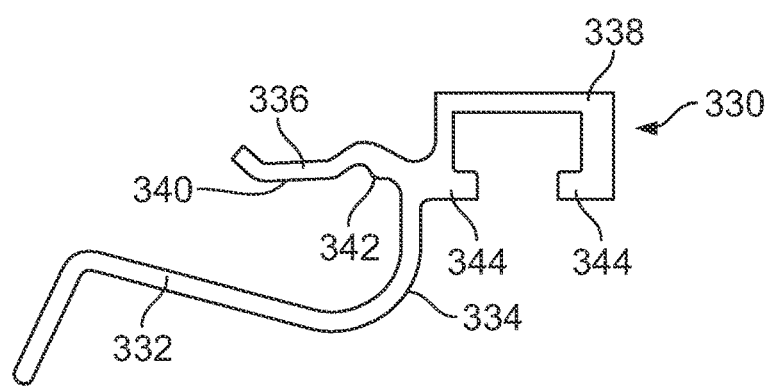

Referring to FIG. 11C, in another embodiment, a bracket 330 includes a first member 332 having a curved portion 334, a second member 336 extending from one side of the curved portion 334, and a pocket 338 extending from an opposite side of the second member 336. In an embodiment, the second member 336 includes a channel 340 formed within an inner side 342 thereof and configured to be secured to the frame 60 of the photovoltaic module 28. In an embodiment, the pocket 338 is sized and shaped to removably receive the MLPE apparatus 302. In an embodiment, the pocket 338 includes a pair of opposed L-shaped members 344. In an embodiment, the pocket 338 includes a C-shape cross-section. In other embodiment, the pocket 338 includes other suitable shapes and sizes to secure the MLPE apparatus 302.

Figure 12:
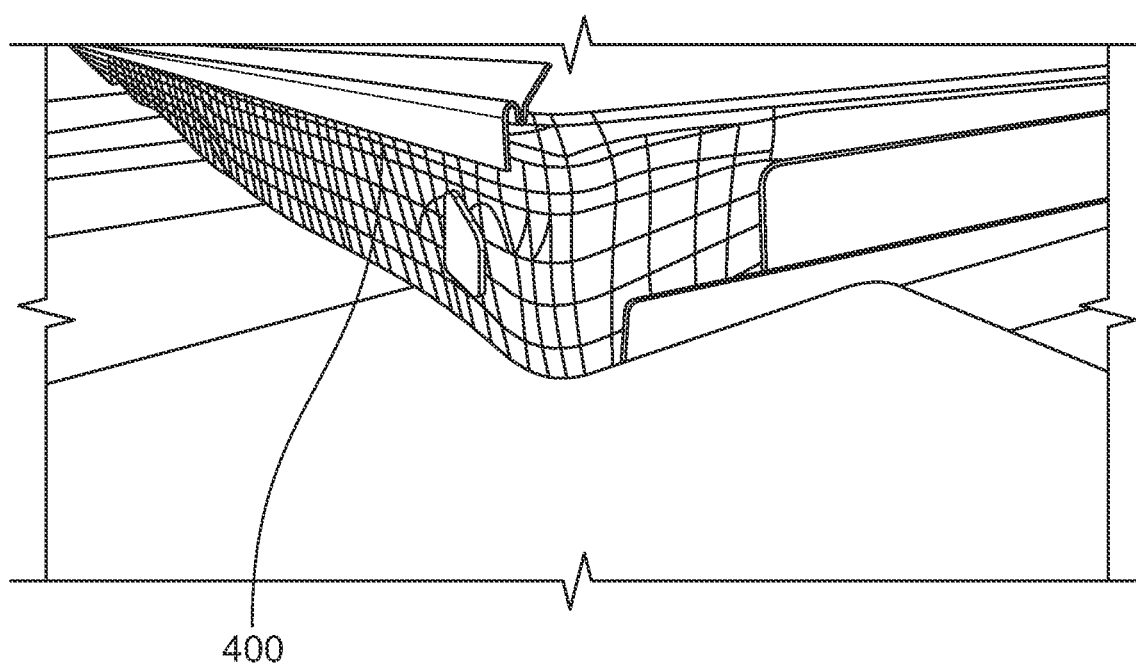
FIG. 12 is a photograph of an embodiment of a net employed by a roof integrated photovoltaic system.

Referring to FIG. 12, the system 10 includes a net 400 positioned around the perimeter of the photovoltaic module 28 to prevent pests from entering a space between the photovoltaic module 28 and the water shedding layers 16, 48 thereunder.

In another embodiment, a method for installing a roof integrated photovoltaic system includes the following steps:

Installing a base layer to a roof deck, the base layer having a first side and a second side opposite the first side, the first side including an adhesive with a first width and the second side including an adhesive with a second width that is narrower than the first width. In an embodiment, the base layer consists of QUICK-START® peel and stick starter roll roofing material manufactured and sold by GAF.

Installing a starter bar on the base layer and to the roof deck, the starter bar including a foot base. In an embodiment, the foot base is affixed to the roof deck by fasteners.

Installing a first water shedding layer over the foot base of the starter bar and affixing the first water shedding layer to the roof deck. In an embodiment, the width of the first water shedding layer will be about half of the width of the subsequently installed water shedding layers. In an embodiment, the first water shedding layer is affixed to the roof deck by a plurality of fasteners. In an embodiment, the first water shedding layer covers the fasteners affixing the starter bar to protect them from moisture penetration.

Installing a second water shedding layer over the first water shedding layer. In an embodiment, the second water shedding layer includes a width that is twice the width of the first water shedding layer. In an embodiment, the second water shedding layer fully covers the first water shedding layer. In an embodiment, the second water shedding layers is affixed to the roof deck by a plurality of fasteners. In an embodiment, from this point forward, each full-width of the water shedding layers is shifted by half of the width.

Installing foot modules on the second water shedding layer.

Installing a third water shedding layer over the foot modules. This method ensures every point on the roof deck is covered by two layers of the water shedding layers. In an embodiment, each fastener is sandwiched between a water shedding layer underneath the fastener and a water shedding layer below the fastener. In another alternate embodiment, if only one water shedding layer is required, the overlap between the water shedding layers will be characterized to the fastener zones to cover the fasteners. In this regard, the shift between the water shedding layers will be more than half of the width of the water shedding layers. In an embodiment, the water shedding layers include a width equal to width of the photovoltaic module width divided evenly, thereby foregoing the need for pre-measuring and enabling self-templating.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated). All such variations and modifications are intended to be included within the scope of the invention as defined in the appended claims.

What is claimed is:

1. A method, comprising:
   installing a starter bar to a roof deck,
   wherein the starter bar includes first and second foot bases;
   wherein the first and second foot bases extend along a length of the starter bar;
   installing one of a first plurality of water shedding layers over the first and second foot bases of the starter bar;
   overlapping at least one of another of the first plurality of water shedding layers over the one of the first plurality of water shedding layers;
   installing first and second foot modules on at least one of the first plurality of water shedding layers;
   overlapping one layer of a second plurality of water shedding layers over both
   the first and second foot modules, and
   at least one of the first plurality of water shedding layers;
   installing a first photovoltaic module, the first photovoltaic module having
   a top surface,
   a bottom surface,
   an upper portion,
   a lower portion, and
   a pair of side portions, each of which extends from the upper portion to the lower portion,
   wherein the upper portion of the first photovoltaic module attaches to the first and second foot modules,
   wherein the lower portion of the first photovoltaic module overlaps the first and second foot bases of the starter bar and connects to the starter bar,
   wherein the starter bar extends along the entire length of the lower portion of the photovoltaic module.

2. The method of claim 1, wherein the last overlapping layer of the at least one of another of the first plurality of water shedding layers includes a second water shedding layer.

3. The method of claim 2, further comprising the step of affixing the one of the first plurality of water shedding layers and the second water shedding layer to the roof deck.

4. The method of claim 1, wherein the at least one of another of the first plurality of water shedding layers includes a second water shedding layer overlapping the one of the first plurality of water shedding layers, and a third water shedding layer overlapping the second water shedding layer, the third water shedding layer being the last overlapping layer of the at least one of another of the first plurality of water shedding layers.

5. The method of claim 4, further comprising the step of affixing the one of the first plurality of water shedding layers and the second and third water shedding layers to the roof deck.

6. The method of claim 4, wherein the second water shedding layer includes a first edge that is positioned offset from the first foot base of the starter bar, and the third water shedding layer includes a first edge that is positioned offset from the first edge of the second water shedding layer.

7. The method of claim 1, wherein the at least one of another of the first plurality of water shedding layers includes a second water shedding layer overlapping the one of the first plurality of water shedding layers, a third water shedding layer overlapping the second water shedding layer, and a fourth water shedding layer overlapping the third water shedding layer, the fourth water shedding layer being the last overlapping layer of the at least one of another of the first plurality of water shedding layers.

8. The method of claim 7, further comprising the step of affixing the one of the first plurality of water shedding layers and the second, third and fourth water shedding layers to the roof deck.

9. The method of claim 7, wherein the second water shedding layer includes a first edge that is positioned offset from the first foot base of the starter bar, the third water shedding layer includes a first edge that is positioned offset from the first edge of the second water shedding layer, and the fourth water shedding layer includes a first edge that is positioned offset from the first edge of the third water shedding layer.

10. The method of claim 7, further comprising the step of:
    installing third and fourth foot modules; and
    installing at least one second photovoltaic module, the at least one second photovoltaic module having
    a top surface,
    a bottom surface,
    an upper portion,
    a lower portion, and
    a pair of side portions, each of which extends from the upper portion of the at least one second photovoltaic module to the lower portion of the second photovoltaic module, and
    wherein the upper portion of the second photovoltaic module attaches to the third and fourth foot modules,
    wherein the lower portion of the second photovoltaic module is aligned with the first and second foot modules, and
    wherein third and fourth foot modules are affixed on a last overlapping layer of the second plurality of water shedding layers to the roof deck.

11. A system, comprising:
    a starter bar installed on a roof deck,
    wherein the starter bar includes first and second foot bases;
    wherein the first and second foot bases extend along a length of the starter bar;
    a first plurality of water shedding layers, one of which installed over the first and second foot bases of the starter bar, and at least one of another of which installed over the one of the first plurality of water shedding layers;
    first and second foot modules installed on at least one of the first plurality of water shedding layers;
    a second plurality of water shedding layers, one of which installed over both
    the first and second foot modules, and
    at least one of the first plurality of water shedding layers;
    a first photovoltaic module having
    a top surface,
    a bottom surface,
    an upper portion,
    a lower portion, and
    a pair of side portions, each of which extends from the upper portion to the lower portion; and wherein the upper portion of the first photovoltaic module attached to the first and second foot modules, wherein the lower portion of the first photovoltaic module overlapping the first and second foot base of the starter bar and connecting to the starter bar, and wherein the starter bar extends along the entire length of the lower portion of the photovoltaic module.

12. The system of claim 11, wherein the last overlapping layer of the at least one of another of the first plurality of water shedding layers includes a second water shedding layer.

13. The system of claim 11, wherein the at least one of another of the first plurality of water shedding layers includes a second water shedding layer overlapping the one of the first plurality of water shedding layers, and a third water shedding layer overlapping the second water shedding layer, the third water shedding layer being the last overlapping layer of the at least one of another of the first plurality of water shedding layers.

14. The system of claim 11, wherein the at least one of another of the first plurality of water shedding layers includes a second water shedding layer overlapping the one of the first plurality of water shedding layers, a third water shedding layer overlapping the second water shedding layer, and a fourth water shedding layer overlapping the third water shedding layer, the fourth water shedding layer being the last overlapping layer of the at least one of another of the first plurality of water shedding layers.

15. The system of claim 11, further comprising:
a second photovoltaic module,
the second photovoltaic module having
a top surface,
a bottom surface,
an upper portion,
a lower portion, and
a pair of side portions, each of which extends from the upper portion of the second photovoltaic module to the lower portion of the second photovoltaic module; and third and fourth foot modules attached to the upper portion of the at least one second photovoltaic module, wherein the lower portion of the second photovoltaic module aligns with the first and second foot modules, and the third and fourth foot modules affixed on a last overlapping layer of the second plurality of water shedding layers to the roof deck.

16. The system of claim 11, further comprising a bracket for at least one module-level power electronic, the bracket attached to the at least one first photovoltaic module, and the at least one module-level power electronic positioned under the bottom surface of the at least one first photovoltaic module.

17. The system of claim 16, wherein the bracket includes at least one hook member removably attached to at least one of the top portion, the lower portion and either of the side portions of the at least one first photovoltaic module.

* * * * *